(12) United States Patent
Glunz et al.

(10) Patent No.: US 8,591,056 B2
(45) Date of Patent: Nov. 26, 2013

(54) ILLUMINATED HOOF PICK

(76) Inventors: Maralee Glunz, Chicago, IL (US); Joanne M. Stoynoff, Chicago, IL (US)

(*) Notice: Subject to any disclaimer, the term of this patent is extended or adjusted under 35 U.S.C. 154(b) by 161 days.

(21) Appl. No.: 13/348,152

(22) Filed: Jan. 11, 2012

(65) Prior Publication Data

US 2012/0176775 A1 Jul. 12, 2012

Related U.S. Application Data

(60) Provisional application No. 61/431,888, filed on Jan. 12, 2011.

(51) Int. Cl.
  *B25B 23/18* (2006.01)
(52) U.S. Cl.
  USPC .............. 362/119; 362/120; 362/253
(58) Field of Classification Search
  USPC ......................... 362/109, 120, 253
  See application file for complete search history.

(56) References Cited

U.S. PATENT DOCUMENTS

| | | | |
|---|---|---|---|
| 544,540 A | 8/1895 | Jones | |
| D47,144 S | 3/1915 | Pfister | |
| D47,263 S | 4/1915 | Ladd | |
| D110,363 S | 7/1938 | Racicot | |
| D175,365 S | 8/1955 | Racicot | |
| D196,251 S | 9/1963 | Hubbard | |
| D240,188 S | 6/1976 | Lytle | |
| D252,849 S | 9/1979 | Weiss | |
| 4,367,798 A | 1/1983 | Sabol | |
| 5,168,935 A * | 12/1992 | Thornbury et al. | 168/48.1 |
| 5,176,222 A * | 1/1993 | Tippin | 168/48.1 |
| D365,895 S | 1/1996 | Graves et al. | |
| 5,636,697 A | 6/1997 | Pitchford | |
| D381,474 S | 7/1997 | Dalton | |
| D382,453 S | 8/1997 | Drinkwater | |
| 6,131,231 A | 10/2000 | Huang | |
| 6,176,319 B1 | 1/2001 | Ehrmann | |
| D437,488 S | 2/2001 | Weiss | |
| D439,490 S | 3/2001 | Bagley | |
| D443,396 S * | 6/2001 | Bison et al. | D30/158 |
| D448,552 S | 10/2001 | Richards | |
| D448,572 S | 10/2001 | Gravlee | |
| 6,325,522 B1 * | 12/2001 | Walian | 362/119 |
| D466,770 S | 12/2002 | Kelleghan | |
| D479,970 S | 9/2003 | Hutchinson | |
| D496,569 S | 9/2004 | Shun | |
| D500,647 S | 1/2005 | So | |
| D501,773 S | 2/2005 | Kohn | |
| D541,122 S | 4/2007 | Chaconas | |
| D548,032 S | 8/2007 | Hernandez, Jr. | |
| D600,920 S | 9/2009 | Yeh | |
| 7,628,215 B2 | 12/2009 | Nickle | |
| D609,986 S | 2/2010 | Crane et al. | |
| 7,827,884 B2 | 11/2010 | Lawson | |
| D629,288 S | 12/2010 | Kelleghan | |
| D643,269 S | 8/2011 | Mah et al. | |
| D652,282 S | 1/2012 | Yasher et al. | |
| 2005/0252343 A1 | 11/2005 | Turner | |
| 2008/0190625 A1 * | 8/2008 | Gibbs | 168/48.1 |

\* cited by examiner

*Primary Examiner* — Ali Alavi
(74) *Attorney, Agent, or Firm* — Mark J. Nahnsen; Barnes & Thornburg LLP

(57) ABSTRACT

An illuminated tool for cleaning hooves of hooved animals includes a prong having a tip adapted to engage and clean an animal's hoof and an illumination source configured to direct a light beam in the general direction of the tip of the prong.

20 Claims, 3 Drawing Sheets

ILLUMINATED HOOF PICK

CROSS REFERENCE TO RELATED APPLICATIONS

This application claims the benefit of priority under 35 U.S.C. §119(e) to copending U.S. Provisional Patent Application No. 61/431,888, filed Jan. 12, 2011, the content of which is incorporated herein by reference in its entirety.

BACKGROUND AND SUMMARY

The present disclosure is related to a tool for cleaning hooves of hooved animals, such as horses. In particular, the present disclosure is directed to a tool, commonly known as a hoof pick, which is used to remove dirt, mud, stones, and like material from animal hooves. Further, the present disclosure includes an illumination source configured to direct a light beam in the direction of the working area of the tool.

For example, hooved animals such as domesticated horses are frequently used for recreational riding or rock trips. Such recreational riding frequently occurs on surfaces of dirt, clay, mud, etc. or on paved or gravel roads. The surface material is impacted into the animal's hooves forming a hard dense concrete-like mass. Stones and/or gravel often become wedged in the grooves of the hoof or between the hoof and a protective shoe. If left for extended periods, this can result in injury to the animal, such as lameness. Before and after the animal has been ridden, it is good practice for the rider or other caretaker to groom the animal including removing the impacted material from the animal's hooves. A hoof pick is a tool having a prong or tip for breaking up and loosening the impacted material. Such grooming activities are commonly done in a barn and/or stall that is dimly lighted, making it difficult to see whether there remains any material in the animal's hooves. The present disclosure provides a hoof pick with an illumination source to facilitate use in dimly lighted areas.

One aspect of the present disclosure includes a tool having a housing which is configured to have two substantially planar parallel faces and a sidewall disposed between and connecting the faces. The housing further includes a head section and handle section. The head section is formed at one end of the housing with the handle section extending from the head section generally linearly along a first axis. A prong extends from the housing at the head section. The prong includes a tip adapted to engage and clean an animal's hoof. The prong is secured within the housing, extending through the sidewall of the head section along the first axis for a distance, wherein the prong is bent at an angle relative to the first axis. The housing also includes an aperture formed within the sidewall of the head section adapted to receive an illumination source. The aperture is oriented along a second axis and configured such that the illumination source projects a light beam in the general direction of the tip of the prong. The tool also includes a switch mounted internal to the head section and connected to the illumination source. The switch having an actuator positioned to be operated from the outside of the housing and having an ON position and an OFF position. The tool also includes a power source positioned inside the housing and connected to the switch, wherein the power source provides electrical energy to the illumination source when the switch is in the ON position.

BRIEF DESCRIPTION OF THE DRAWINGS

The present disclosure will be described hereafter with reference to the attached drawings which are given as a non-limiting example only, in which.

DETAILED DESCRIPTION

Figure 1:
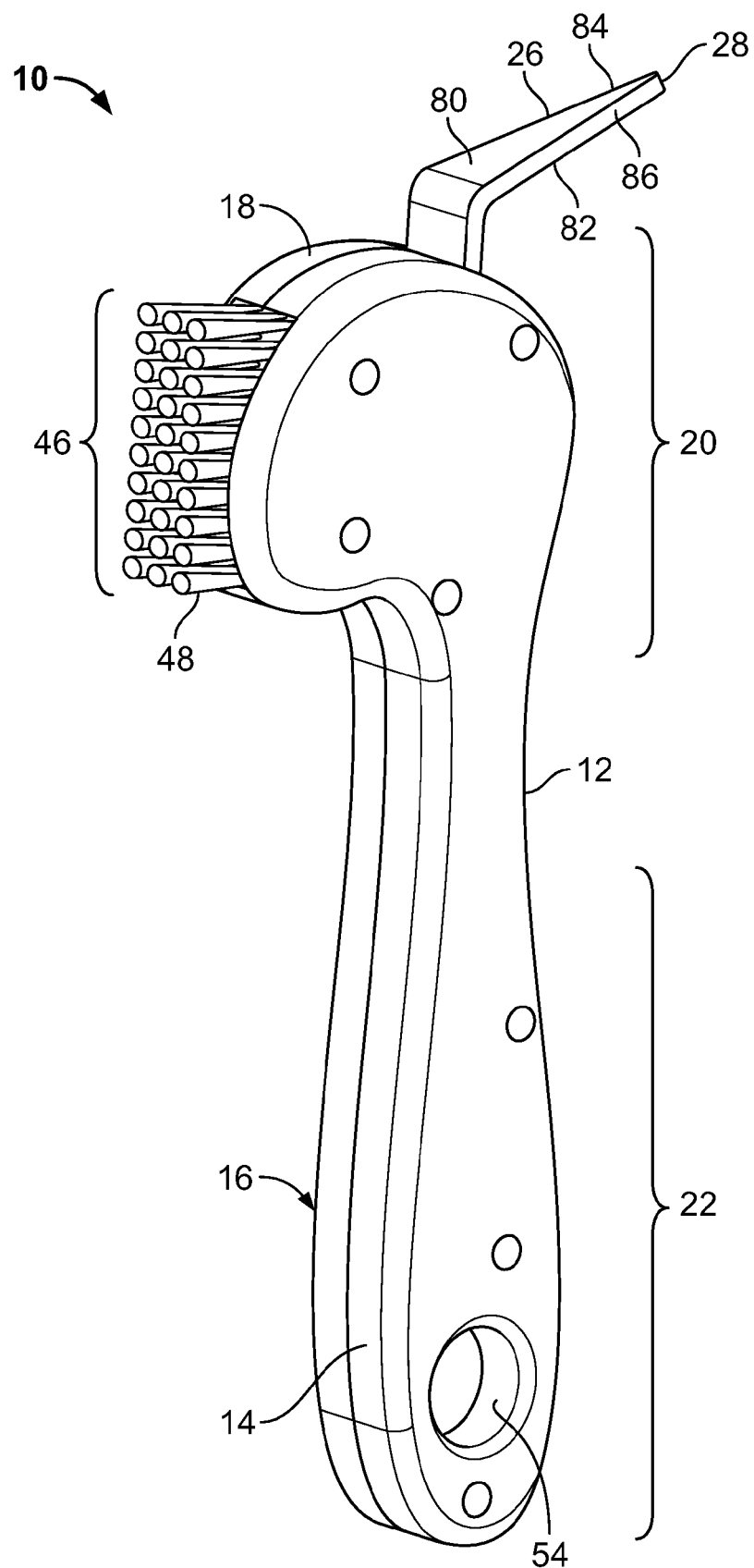
FIG. 1 is a perspective view of a first embodiment of a illuminated hoof pick of the present disclosure.

The present disclosure is directed to a tool 10 for cleaning hooves of hoofed animals, for example horses. The tool includes a housing 12. In an exemplary embodiment shown in FIG. 1, the housing 12 is configured to include two substantially planar parallel faces 14, 16 and a sidewall 18 disposed between and connecting faces 14, 16. The housing 12 further includes a head section 20 formed at one end of the housing 12 and a handle section 22 extending from the head section 20 generally linearly along a first axis 24.

The tool 10 further includes a prong 26 extending from the housing 12 at the head section 20. Prong 26 includes tip 28 adapted to engage and clean a hoof. In the exemplary embodiment, the prong 26 extends through the sidewall 18 of the housing generally along the first axis 24 for a distance and then is bent at an angle A from about 75 degrees to about 110 degrees relative to the first axis 24 and extends along a second axis 27. In an exemplary embodiment, the prong 26 may be constructed from a wear-resistant metal such as stamped steel and bent at the desired angle. Prong 26 may be held in place in the housing 12 by methods commonly known in the art, such as by an epoxy, ultrasonic welding, press fit, or other suitable means.

Figure 3:
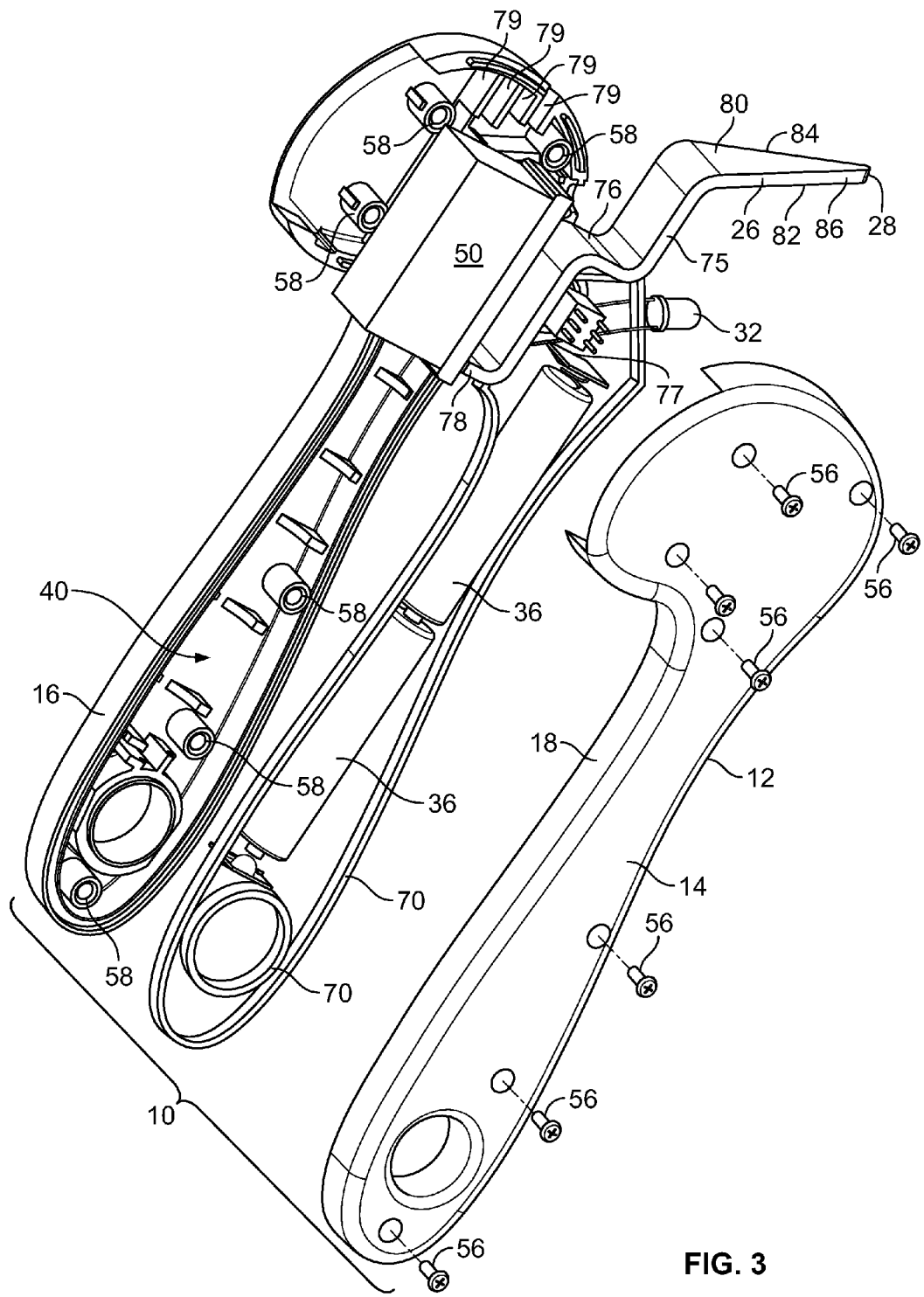
FIG. 3 is an exploded view of a second embodiment of an illuminated hoof pick of the present disclosure.

As best seen in FIGS. 1 and 3, the prong 26 of the tool 10 includes a top surface 80, a bottom surface 82, and side edges 84, 86. The side edges 84, 86 taper inwardly toward the tip 28 of the prong 26.

The housing 12 further includes an aperture 30 formed within the sidewall 18 of the head section 20. Aperture 30 is adapted to receive an illumination source 32, such as a light bulb, light emitting diode, and the like. Aperture 30 is oriented along a third axis 34. Aperture 30 is configured such that the illumination source 32 disposed therein projects a light beam outward from the housing generally along third axis 34 in the direction of the tip 28 of prong 26. The third axis 34 is generally disposed at an angle B from the first axis 24 from about 70 degrees to about 110 degrees. In addition, the second axis 27 and the third axis 34 are at an angle C from about 15 degrees to about 55 degrees from one another.

Figure 2:
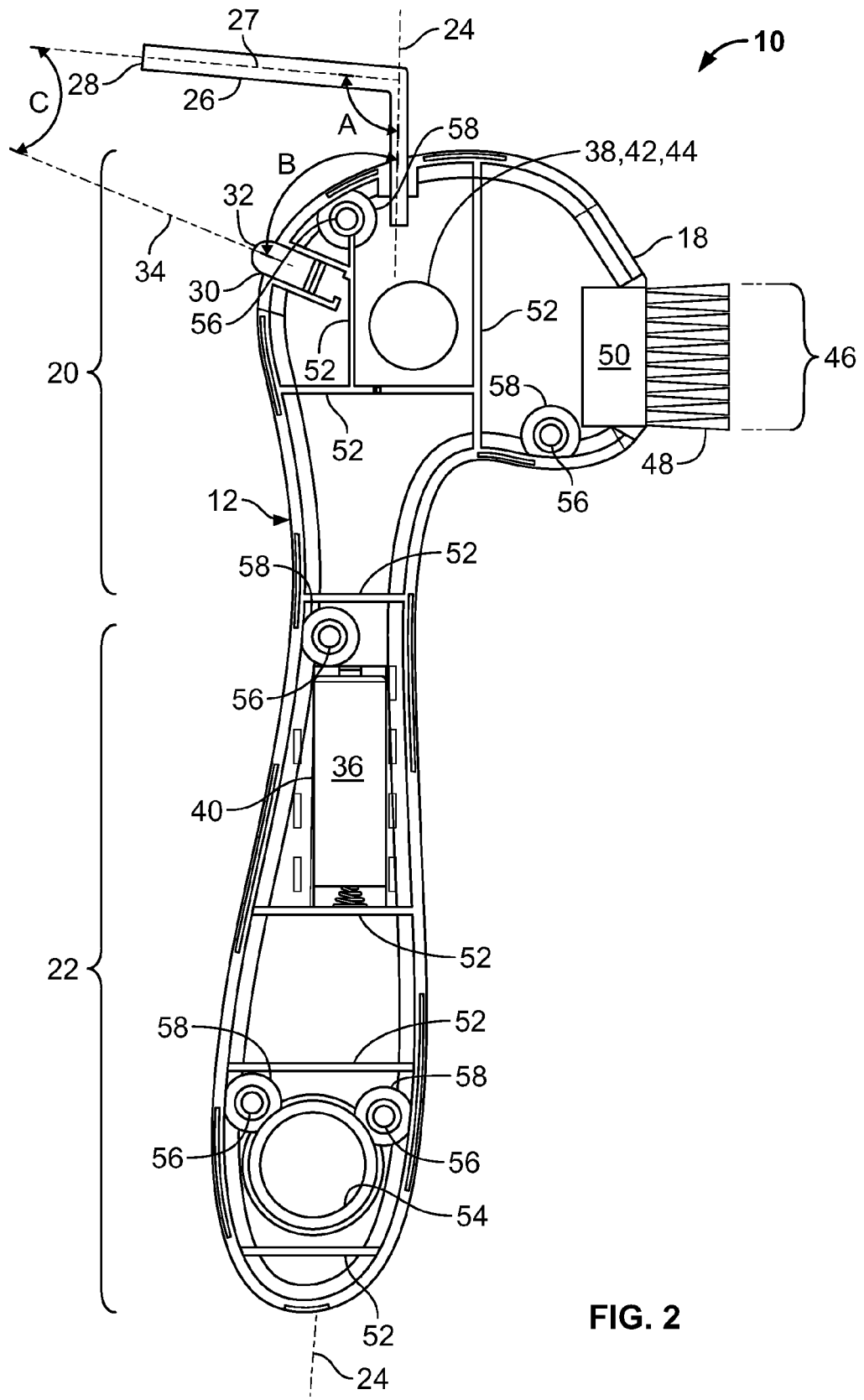
FIG. 2 is a cut-away side view of the tool of the present disclosure.

A power source 36, such as a battery, is provided to supply electrical energy to the illumination source 32. A switch 38 may also be provided, mounted within the housing 12, electrically connected between the illumination source 32 and the power source 36. Switch 38 is configured with an ON position and an OFF position allowing a user to turn the illumination source 32 on and off. In the exemplary embodiment shown in FIG. 2, a battery compartment 40 is provided within the handle section 22 configured to hold the power source 36 and the switch 38 is provided in the head section 20 of housing 12. Switch 38 includes an actuator 42 adapted to make and break electrical contact between the power source 36 and the illumination source 32, allowing the illumination source 32 to be turned on and off. In an exemplary embodiment, the actuator 42 is configured as a pushbutton disposed within an aperture 44 located in one of the faces 14, 16 of the housing 12 in the head section 20. Switch 38 is located so as to allow a user grasping the tool 10 of the present disclosure by the handle portion 20 to operate the switch 38 using his or her thumb. The actuator 42 of the switch 38 may be configured to lie flush with the face of the housing 12 to prevent inadvertent activation if carried in a pocket or jacket.

The tool 10 of the present disclosure further includes a brush 46 mounted in the head section 20. The brush 46 includes a plurality of bristles 48 embedded in a mounting block 50. The mounting block 50 is adapted to be received and secured within the head section 20 of the housing 12 such that the bristles 48 extend outwardly from the sidewall 18. Brush 46 may be held in place my methods known in the art, such as by an epoxy, ultrasonic welding, press fit or other suitable means. The brush 46 is configured to allow a user to clear sweep away dirt, mud, stones and other debris from an animal hoof after loosening the material with the tip 28 of prong 26.

In an exemplary embodiment, housing 12 may include a number of internal ribs 52 disposed within the interior of the housing 12 and adapted to provide strength to the housing 12. Further, handle section 22 may include a suspension aperture 54 through faces 14, 16 of housing 12. The suspension aperture 54 is adapted to allow the tool 10 to be suspended from a hanger, such as a nail, attached to an animal stall for storage when not in use. Additionally, suspension aperture 54 is adapted for attachment of a lanyard or strap to allow a user to carry and/or hang the tool 10.

The housing 12 for the tool of the present disclosure may be constructed from a high density polyethylene (HDPE) injection molded into the desired form. HDPE provides a desirable combination of impact toughness and tensile strength. HDPE has an opaque appearance and may be colored depending on aesthetic considerations. Further HDPE provides excellent resistance to chemicals and low temperature impact properties. HDPE is provided by way of non-limiting example only and other materials and plastics (such as acrylonitrile butadiene styrene (ABS)) may be equally acceptable for constructing the housing 12 of the present disclosure.

The housing 12 may be molded in two portions, each portion corresponding to a face 14, 16 and part of the sidewall 18. The internal components such as the prong 26, illumination source 32, power source 36, switch 38, and brush 46, may be positioned within one portion of the housing 12 and two portions of the housing may then be fitted together and ultrasonically welded together. Further, the interior of the housing 12 may include guide pins 56 protruding from one of the housing portions configured to mate with guide pin receptacles 58 formed in the other housing portion. The guide pins 56 and guide pin receptacles 58 are positioned to ensure proper alignment of the two portions of the housing when fitted together.

FIG. 3 depicts a second embodiment of a tool 10 for cleaning hooves of animals. The embodiment of FIG. 3 is similar to the embodiment of FIGS. 1 and 2 except that the embodiment of FIG. 3 further includes a gasket material 70 disposed between sections of the sidewall 18 associated with the faces 14, 16. The gasket material 70 prevents water and/or other fluids from penetrating an entering the tool 10, in particular, the electrical components of the tool 10. In addition, a number of ribs 72 are disposed on internal sides of the faces 14, 16 to add strength and support to the tool 10.

Still referring to the embodiment of FIG. 3, the prong 26 includes a support piece 74 integral with the prong 26. The support piece 74 adds a lever arm to the prong 26 to prevent withdrawal of the prong 26 from the tool 10 and allow the prong 26 and the tip 28 to withstand greater forces. The support piece 74 includes a first segment 75 extending at the angle A (FIG. 2) and extending longitudinally away from the prong 26 and a second segment 76 extending generally perpendicular from the first segment 75 and extending laterally away from the prong 26, wherein the first and second segments 75, 76 generally form an L-shape. The support piece 74 further includes a third segment 77 generally perpendicular to the second segment 76 and extending longitudinally away from the prong 26 and a lip 78 curving laterally away from the third segment 77 and the prong 26 to generally form an L-shape with the third segment 77. In this embodiment, the tool 10 preferably includes an internal retaining structure(s) or channel(s) to maintain the first, second, and third segments 75, 76, 77 and lip 78 in position and retain the prong 26 within the tool 10. For example, the structures 79 aid in retaining and preventing movement or extraction of the support piece 74 and prong 26. Any number of retaining structures, channels, etc. may be utilized to support, position, and retain the support piece 74 and prong 26.

The illuminated hoof pick tool of the present disclosure allows a user to have an illuminated work area by holding the tool in one hand for normal use while allowing the other hand to be free to grasp the animal hoof.

While preferred embodiments of the present disclosure are shown and described, it is envisioned that those skilled in the art may devise various modifications without departing from the spirit and scope of the present disclosure.

We claim:

1. An illuminated tool for cleaning hooves of animals, the tool comprising:
a housing including two substantially parallel faces and a sidewall disposed between and connecting the faces, the housing further including a head section and a handle section, the head section formed at one end of the housing and the handle section extending linearly along a first axis from the head section;
a prong including a tip, adapted to engage and clean a hoof, the prong secured within and extending from the head section along the first axis for a distance wherein the prong is bent at an angle to the first axis, the bent portion extending along a second axis;
an aperture formed in the sidewall of the head section oriented along a third axis and adapted to receive an illumination source; and
an illumination source positioned within the aperture at an angle to the prong such that a light beam is projected along the third axis to shine on the tip of the prong.

2. The illuminated tool of claim 1, further including a switch mounted internal to the head section and connected to the illumination source, the switch having an actuator positioned to be operated from the outside of the housing, the switch having ON and OFF positions.

3. The illuminated tool of claim 2, further including a power source positioned inside the housing and connected to the switch to provide electrical energy to the illumination source when the switch is in the ON position.

4. The illuminated tool of claim 1, wherein an angle formed between the first axis and the second axis is about between about 75 degrees and about 110 degrees.

5. The illuminated tool of claim 1, wherein an angle formed between the second axis and the third axis is between about 70 degrees and about 110 degrees.

6. The illuminated tool of claim 1, wherein an angle formed between the first axis and the third axis is between about 15 degrees and about 55 degrees.

7. The illuminated tool of claim 1, further including a brush including a plurality of bristles and extending from the housing on a side of the housing opposite the illumination source.

8. The illuminated tool of claim 7, wherein the bristles of the brush are embedded in a mounting block, which is received and secured within the head section of the housing.

9. The illuminated tool of claim 1, further including a gasket disposed between sections of the sidewall corresponding to the parallel faces.

10. The illuminated tool of claim 1, further including a suspension aperture disposed through the handle portion of the housing for hanging or otherwise suspending or holding the tool.

11. An illuminated tool for cleaning hooves of animals, the tool comprising:
- a housing including a head section and a handle section, the head section formed at one end of the housing and including first and second surfaces and the handle section generally linearly extending along a first axis from the head section;
- a pick member adapted to engage and remove debris from a hoof, the pick secured within and extending from the head section at an angle to the first axis;
- an aperture formed in the first surface of the head section and adapted to house an illumination source; and
- an illumination source position with the housing and adapted to provide illumination through the aperture at an angle to the pick member such that a central axis of a projected light beam will shine on an engaging end of the pick member.

12. The illuminated tool of claim 11, further including a switch mounted internal to the housing and connected to the illumination source, the switch having an actuator positioned to be operated from the outside of the housing, the switch having ON and OFF positions.

13. The illuminated tool of claim 12, further including a battery operated power source positioned inside the housing and connected to the switch to power the illumination source when the switch is in the ON position.

14. The illuminated tool of claim 1, wherein the pick member includes a first portion extending along the first axis and a second portion that is bent with respect to the first axis and which extends along a second axis that is disposed at an angle of between about 75 and about 110 degrees with respect to the first axis.

15. The illuminated tool of claim 14, wherein an angle formed between the second axis and a third axis extending through the illumination source is between about 70 degrees and about 110 degrees.

16. The illuminated tool of claim 11, further including a brush including a plurality of bristles and extending from the housing on a side of the housing opposite the illumination source.

17. The illuminated tool of claim 16, wherein the bristles of the brush are embedded in a mounting block, which is received and secured within the head section of the housing.

18. The illuminated tool of claim 11, further including a gasket disposed between sections of the sidewall corresponding to the parallel faces.

19. The illuminated tool of claim 11, further including a suspension aperture disposed through the handle portion of the housing for hanging or otherwise suspending or holding the tool.

20. An illuminated tool for cleaning hooves of animals, the tool comprising:
- a housing including two substantially parallel faces and a sidewall disposed between and connecting the faces, the housing further including a head section and a handle section, the head section formed at one end of the housing and the handle section extending linearly along a first axis from the head section;
- a prong including a tip, adapted to engage and clean a hoof, the prong secured within and extending from the head section along the first axis for a distance wherein the prong is bent at a first angle from about 75 degrees to about 100 degrees with respect to the first axis, the bent portion extending along a second axis;
- an aperture formed in the sidewall of the head section oriented along a third axis and adapted to receive an illumination source, wherein the third axis is disposed at a second angle from about 70 degrees to about 110 degrees with respect to the second axis; and
- an illumination source positioned within the aperture such that the first and second angles allow a light beam to be projected along the third axis to shine on the tip of the prong.

* * * * *